Sept. 5, 1961 T. DESSILANI 2,998,748
MACHINE FOR PROJECTIONS OF CINEMATOGRAPH FILMS
CARRYING A PLURALITY OF SAID FILMS
Filed Dec. 22, 1958 4 Sheets-Sheet 1
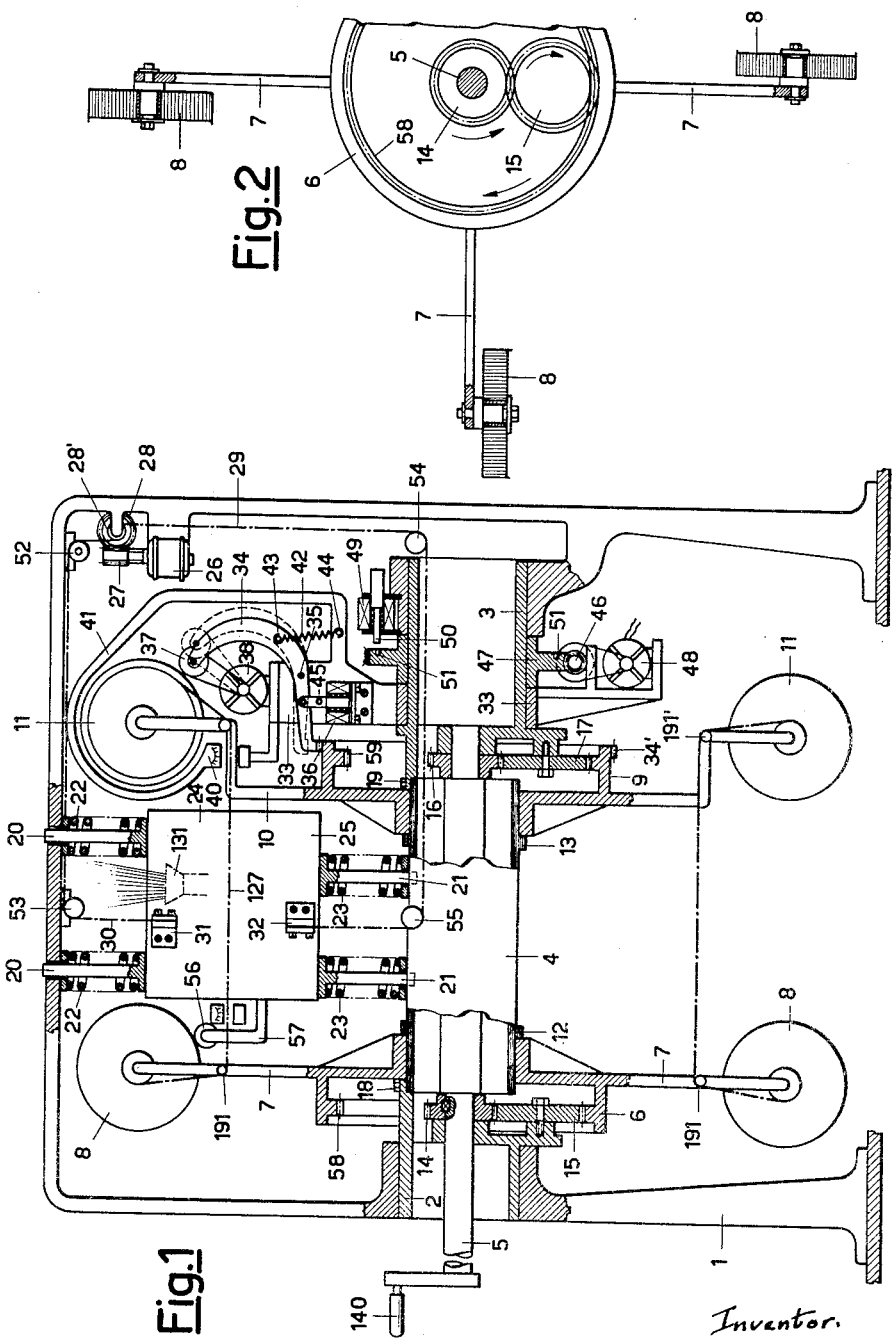
Inventor.
Teresio Dessilani
By B. Eshlinger
Attorney

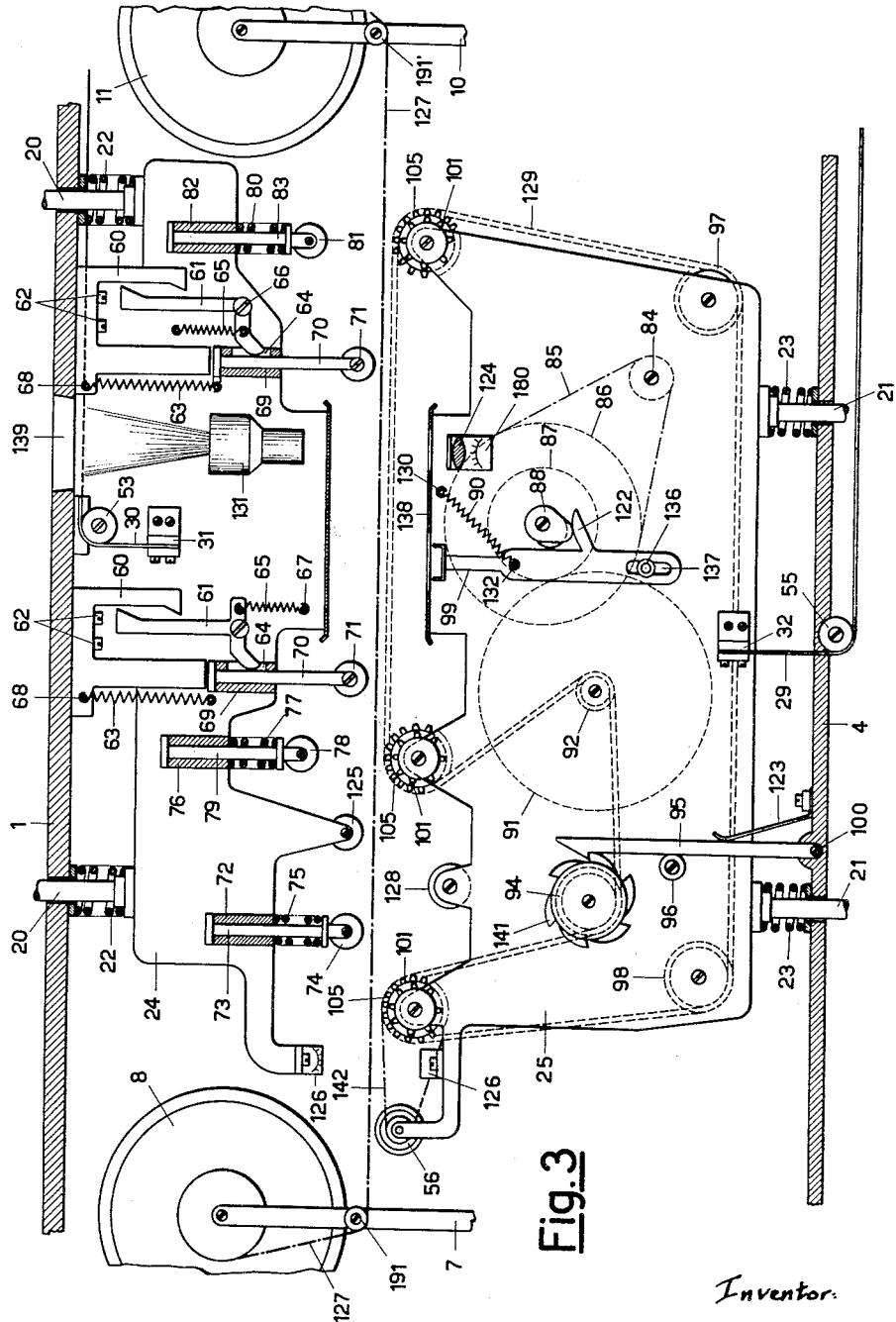

Sept. 5, 1961  T. DESSILANI  2,998,748
MACHINE FOR PROJECTIONS OF CINEMATOGRAPH FILMS
CARRYING A PLURALITY OF SAID FILMS
Filed Dec. 22, 1958  4 Sheets-Sheet 3

Inventor:
Teresio Dessilani
By, B. Ishlinger
Attorney

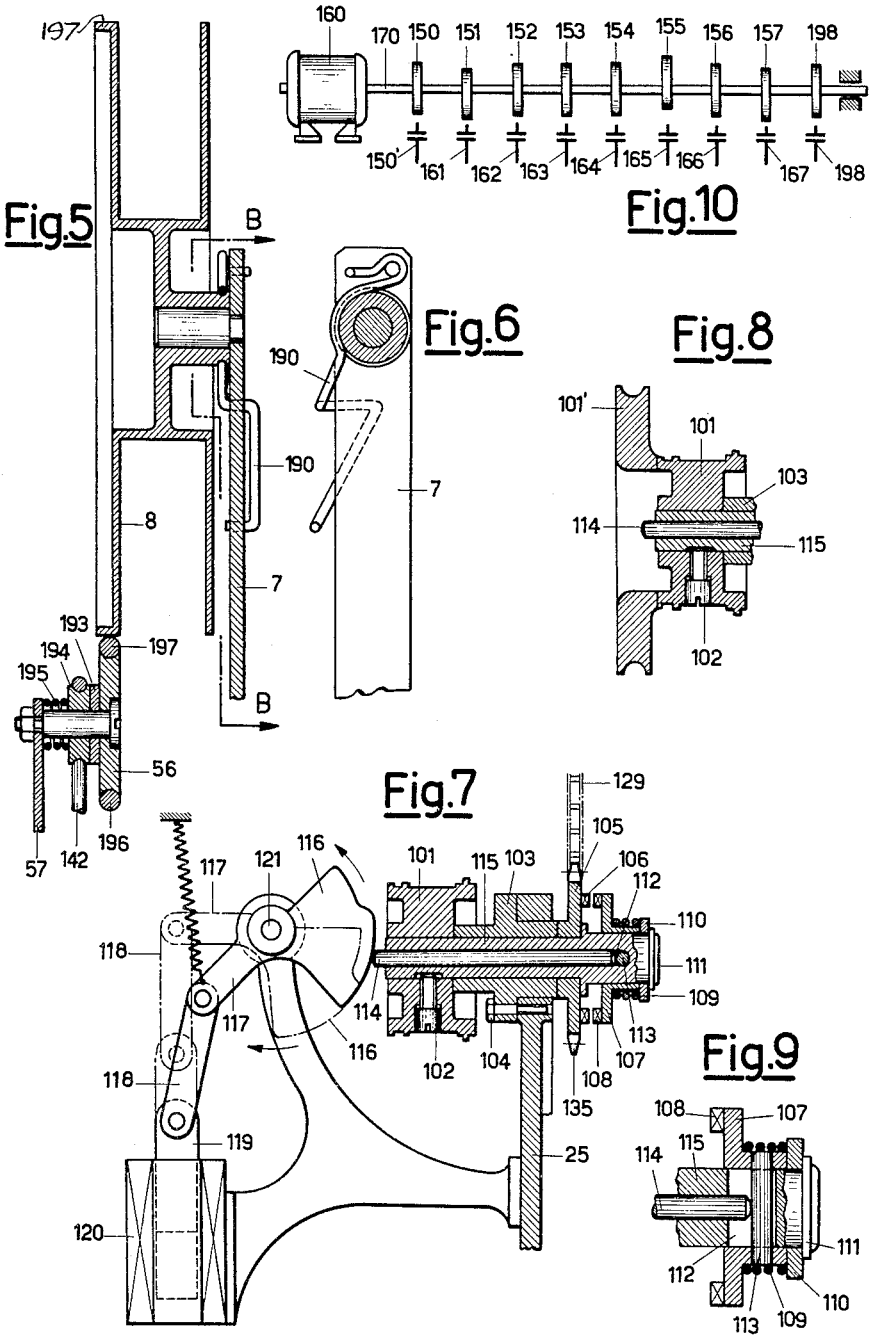

United States Patent Office 2,998,748
Patented Sept. 5, 1961

2,998,748
MACHINE FOR PROJECTIONS OF CINEMATO-GRAPH FILMS CARRYING A PLURALITY OF SAID FILMS
Teresio Dessilani, Via Mazzini 4, Turbigo, Italy
Filed Dec. 22, 1958, Ser. No. 782,312
Claims priority, application Italy Feb. 27, 1958
4 Claims. (Cl. 88—17)

The present invention relates to a machine for projecting cinematograph films.

One of the main objects of the instant invention is to manufacture a projecting machine able to contain a plurality of films of various kinds and which on termination of the projection of any of them produces its immediate replacement in the projecting device by another one of said films present in the machine and, therefore, allows the projection of said subsequent film to take place immediately thereafter.

The second fundamental object of the instant machine is to provide a machine wherein a film which has been transferred to the projecting device will automatically engage with the members adapted to carry along and project the said film.

Another essential object of the present invention is to provide the projecting machine with a device for rewinding the projected film. Such device starts operation automatically as soon as the projection of a film has ended reeling film back on to the spool from which it was unreeled previously, independently of whether control for the projection of a new film has been imparted or not.

The machine for cinematograph projection according to the present invention is provided with a device comprising two parts carrying the members which produce the movement and projection of a film. The parts can be moved away from each other to be at opposite sides of a plane in which there is placed a film stretched between two spools. The parts are also movable toward each other and in approaching the film comes to engage with the members which produce film movement, thereby assuming the necessary undulatory form. There is provided a plurality of pairs of spools, each pair carrying a film with its ends fixed on both spools of the said pair; and means are provided for carrying any selected pair, with the film placed between said parts when they are spaced apart from each other.

According to a preferred embodiment, the instant machine comprises two axially spaced wheels rigid with each other and rotatable around an axis parallel to a horizontal plane between said parts, said wheels carrying in equal number a plurality of spokes, and each spoke carrying rotatably at one end of it a spool for the film. Each pair of spools carrying a respective film is constituted by two corresponding spools, one on each of the two wheels. Also provided are means for determining the rotation of said wheels in such a way that a selected film may be carried between said parts when said parts are being moved away from each other. The machine also comprises means adapted to effect automatically the necessary operations for the projection of the film as well as for stopping said projection when said film has reached its end. The machine further includes means for determining the automatic starting of the rewinding of the film as soon as its projection has ended, rendering said rewinding independent of whether or not a new film has been put in phase.

A projecting apparatus according to the present invention is described hereinafter with reference to the diagrammatic drawing enclosed herewith, wherein:

FIG. 1 shows an overall view partly in section of said machine;

FIG. 2 shows a detail of a wheel carrying the films;

FIG. 3 shows the two plates carrying the members for movement and the projection of the films, in position of being moved away from each other;

FIG. 5 shows an enlarged view of one spool and the drive therefor;

FIG. 6 shows a section taken along the line B—B of FIG. 5 and looking in the direction of the arrows;

FIG. 7 shows in section the clutch mechanism in the drive to the transporting rolls for the film;

FIG. 8 shows a detail of one of said transporting rolls;

FIG. 9 shows a further detail of the device of FIG. 7; and

FIG. 10 shows diagrammatically a shaft carrying a plurality of cams for controlling the members of the machine.

Figure 4:
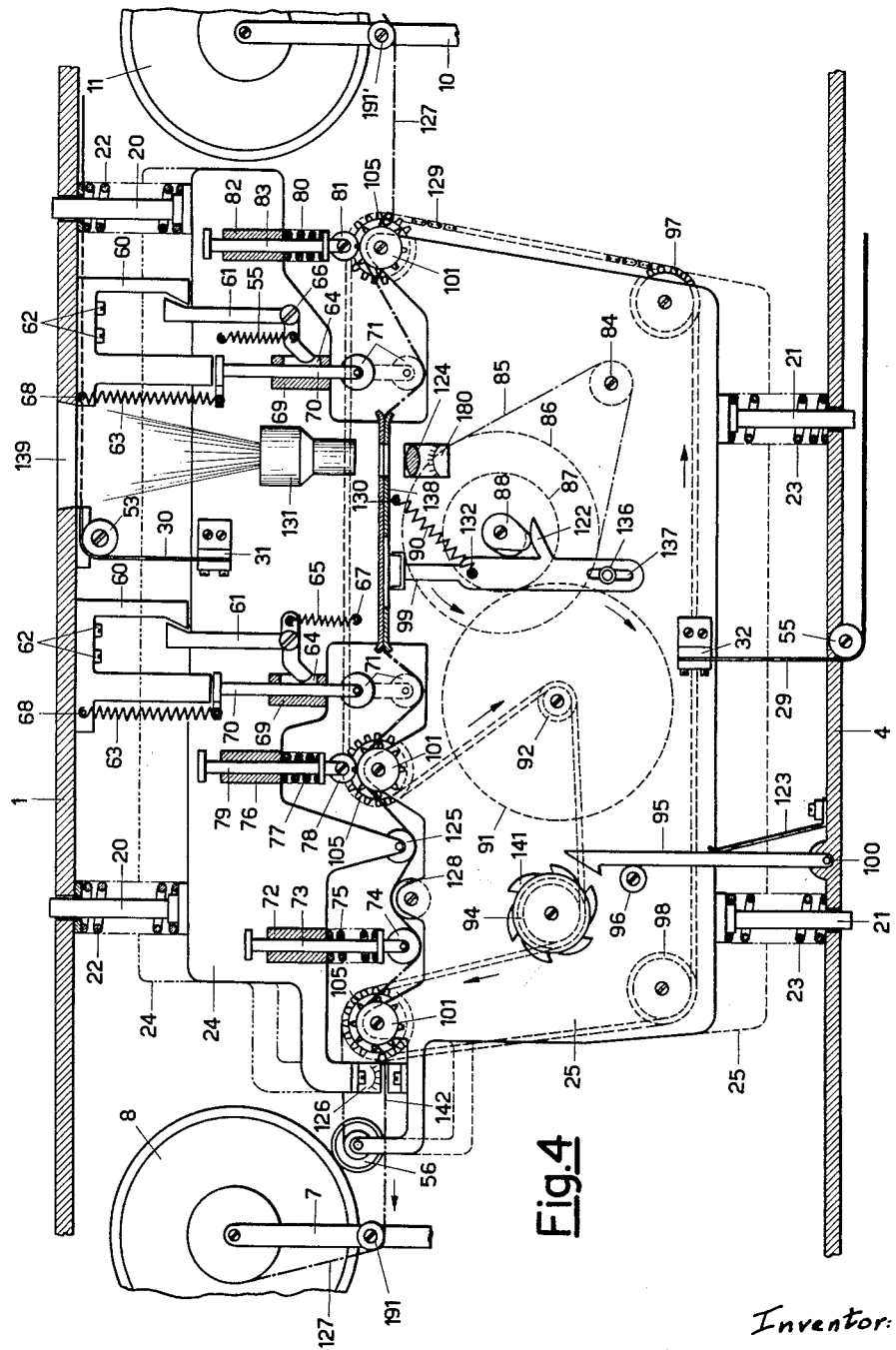
FIG. 4 shows said plates in position of being moved toward each other.

To the frame 1 of the machine there are fixed the supports 2 and 3 which carry a hollow cylindrical element 4 fixed at its two ends by way of the bolts 18 and 19 to said supports 2 and 3.

A shaft 5 passing through the element 4, is supported by the supports 2 and 3 and is actuatable through a handle 140. To said shaft 5 there are fixed the two gears 14 and 16 which are adapted to mesh respectively with the gears 15 and 17, the latter being rotatable around axes fixed respectively with the supports 2 and 3. The shaft 5 can rotate around its own axis but it cannot have translatory displacement in the direction of said axis owing to the meeting of said gears 14 and 16 with said supports 2 and 3 adjacent opposite ends of shaft 5.

On the cylindrical member 4 there are loosely mounted two internal gear wheels 6 and 9. The wheel 6 carries a plurality of spaced, radial spokes 7 at the ends whereof there are rotatably mounted the spools 8, while the wheel 9 carries a plurality of spaced, radial arms 10 at the outer ends of which are rotatably mounted the spools 11 in a number equal to that of said spools 8. The corresponding pairs of spools 8 and 11 carry a plurality of films, each of which has its two ends fixed one to a respective spool 8 and the other one to the corresponding spool 11. Said films have always sections (portions) guided parallel to the shaft 5 because of the small rolls 191 and 191' pivoted on the spokes 7 and 10 respectively. At the inside of the two internal gear wheels 6 and 9 there are provided the gears 58 and 59 which mesh respectively with the gears 15 and 17. Wheel 6 cannot slide in the axial direction because it is held between the inner face of the support 2 and an annular projection 12 on the member 4, while the wheel 9 likewise cannot perform such axial sliding since it is analogously held by the inner face of support 3 and by a projection 13 on said member 4.

In special bores of the frame 1 there slide the rods 20 which are fixed at their lower ends to a plate 24. Interposed between each of said rods 20 and frame 1 there is a spring 22 which tends to push said plate 24 downwards. Within bores of the cylindrical member 4 there are slidable the rods 21 which are analogous to the rods 20, and which are fixed at top to a plate 25. Interposed between each of said rods 21 and member 4 there is a spring 23 tending to push said plate 25 upwards.

Said plates 24 and 25, which by the action of said springs 22 and 23 are put in contact with one another, can be moved away from each other through the action of an electric motor 26 fixed to the frame 1. To the shaft of said motor 26 there is fixed a worm-screw 27 adapted to actuate a helical wheel 28 rotatably mounted on frame 1 and to which there is rigidly attached a pulley 28'. To the latter there are fixed the ends of two ropes 29 and 30. From pulley 28' rope 29 goes through the pulleys 54 and 55 to the plate 25 where it is fixed by the fastening member 32; and the rope 30 goes through the pulleys 52 and 53 to the plate 24 where it is fixed by the member 31. As shown in FIGURES 3 and 4, the plate 24 carries a small wheel 74 rotatably mounted at the end of a rod 73 which is slidable within a hollow cylinder 72 fixed to said plate 24. The small wheel 74 is slightly pushed downwards by the action of a spring 75. In analogous manner the plate 24 carries also the small wheels 78 and 81 rotatably mounted on the rods 79 and 83 slidable respectively within the hollow cylinders 76 and 82 and pressed downwards by the action of two springs 77 and 80. Plate 24 also carries a small wheel 125 pivoted at said plate. Two identical devices are constituted each by a member 60 fixed to the frame 1 of the machine through the screws 62, by a square lever 61 fulcrumed at 66 on the plate 24, by a traction spring 65 attached at one end to the plate 24 at 67 and attached at its other end to said lever 61, by a rod 70 carrying rotatably the small wheel 71 which rod is slidable with the small cylinder 69 and is urged upwards by a spring 63 fixed at top at 68 to the member 60, and at bottom to the head of the rod 70.

The lower end of the lever 61 penetrates through an aperture 64 of the small cylinder 69 thereby coming into contact with the rod 70 when said lever is brought to press by action of the spring 65. The other end of the lever 61 and the lower end of the member 60 facing it are shaped in such a way as to come into contact during the lowering of the small plate 24 and to cause by said contact a rotation of the lever 61 in such a way as to take the lower end of the latter away from the rod 70.

The plate 25 carries some members for the projection and the movement of the film 127. A pulley rigid with a shaft 84 driven by a motor fixed to the plate 25, is connected through the belt 85 to a pulley 86 rotatably mounted on said plate 25. To said pulley 86 there are rigidly connected a gear 87 and a cam 88. The gear 87 meshes with a gear 91 which too is rotatably mounted on the plate 25 and carries fixed thereto a pinion 92. There are further rotatably mounted on the plate 25 the toothed wheels 97, 98 and 94, the last being rigidly connected to a sprocket wheel 141. A chain 129 for the movement of the film, meshes with said wheels 97 and 98, as well as with three toothed wheels 105 and with the toothed wheel 95 and the pinion 92.

Said toothed wheels 105 form part of three devices comprising each one, as shown in FIGURE 7, a roll 101 for transporting the film, said roll being rigidly connected, through a screw 102, to a pin 115 housed in the cylindrical cavity of a body 103 fixed to the plate 25 by means of the screws 104.

Loosely mounted on the pin 115 is said toothed wheel 105 whose peripheral teeth 135 mesh with said chain 129. The same wheel also carries the face clutch teeth 106.

A disc 107, carrying the face-clutch teeth 108 adapted to mesh with the teeth 106 of the wheel 105, is mounted on the pin 115. Rigid with said disc 107 there is a dowel 113 which penetrates into an elongated cavity 112 of the pin 115 thereby rendering rigid with each other in rotation said disc 107 and said pin 115 but permitting the axial displacement of the disc 107.

Fixed to the pin 115 there is a small sealing ring 111 whereon there rests a washer 110 which too is sealing. A spring 109 presses with its ends upon said washer 110 and upon the disc 107 thereby pushing the latter to mesh with the wheel 105. A small rod 114 slidable within a cavity of the pin 115, can be pushed by the action of a cam 116 to be discussed hereinafter, against said dowel 113 so as to cause disengagement between the disc 107 and the wheel 105.

The three cams 116 corresponding to the three devices described above, are carried by a single shaft 121 supported by members fixed to the plate 25 and are driven simultaneously by one single electromagnetic coil 120 having a mobile core 119. The electromagnetic coil 120 too is fixed to the plate 25; and the core 119 is connected by articulation with a small rod 118 which too is connected by articulation with an arm 117 rigid with the cam 116.

Moreover, to one only of the rolls 101 as indicated in FIG. 8, namely to the one nearest to the spools 8, there is fixed a pulley 101' for transmitting, through the belt 142, movement to the spool 8 during projection.

A claw 99 for the intermittent feed of the film, is controlled to perform its periodic movement, through the cam 88 acting upon the arm 122 of the claw, and the spring 90 which is fixed at 130 to the plate 25 and at 132 to the said claw. The latter is guided by a pin 136 fixed to the plate 25 and passing through the elongated slot 137 in said claw 99.

The teeth of the wheel 141 engage the pawl 95 which is fulcrumed at 100 to the fixed member 4, and which is pushed by a spring 123, fixed to said member 4, against a small roll 96 pivoted to the plate 25.

The number of teeth of the ratchet wheel 141 is equal to the ratio of transmission between the gear 94 and the gear 87. Hence, when the ratchet wheel 141 is stationary at the end of the upward movement of plate 25, cam 88 will be in a position such that claw 99 is below element 138.

In FIGURES 3 and 4 is also visible the projection lens 131 carried by the plate 24, from which issues the luminous cone directed to the screen through the slot 139 of the frame 1. In alignment with said lens 131, the plate 25 carries a lens 124 and a sound head 180.

A wheel 56 provided with a gasket 196 is rotatably mounted on the arm 57 (FIG. 5) rigid with the plate 25 and can be actuated through a belt 142 by the wheel 105. Gasket 196 on wheel 56 is in contact with the border 197 of the spool 8 in order to transmit rotation to it, and can be actuated by belt 142 which penetrates into the throat of a pulley 194 which in turn is pressed through the friction element 193 upon the said wheel 56 by the action of a spring 195. The belt 142 moreover penetrates into the throat of pulley 101' (FIG. 8) which is rigid with the roll 101 and is therefore adapted to be driven by wheel 105.

A supporting element 33 (FIG. 1) rotatable around the support 3, carries a device for the rewinding of the film. Said device comprises a lever 34 fulcrumed at 35 to the support 33. Lever 34 carries rotatably at one of its end a small roll 37 which can be controlled to rotate by means of an electric motor 38 to the shaft of which it is connected through a belt; and said motor 38 is fixed to the support 33.

At its other end, the lever 34 can penetrate into special notches 34' distributed along the whole external border of the wheel 9; there being as many notches as there are spools 11 carried by the arms 10 of said wheel 9, so that to each spool there corresponds a notch.

A mobile core 45, composed of two parts connected by articulation with each other and attractable by the electromagnetic coil 36 fixed to the support 33, is connected by articulation to the lever 34 and can impart to said lever, upon being attracted by coil 36, such a rotation as to carry the wheel 37 to contact the border of spool 11 and the other end of the lever to penetrate into the notch corresponding to said spool. A spring 42 fixed at 43 to the lever 34 and at 44 to an arm 41 rigid with the support 33, imparts to said lever 34 a rotation contrary to the one above described, if the magnetic action of said coil 36 is missing.

Fixed to the support 33 there is also an electric motor 48 which can transmit by belt rotation to a worm screw 46 sustained at its two ends by two small supports rigid with said support 33. The worm screw drives a helical gear 47 rotatable on the support 3.

In one side of said helical gear 47, there is a plurality of holes 51, as many as there are spools 11. Into said holes 51 there can penetrate the end of a mobile core 50, said core being attractable by an electromagnetic coil 49.

The support 33 also carries a photoelectric cell 40, the projector of which is fixed to the end of said arm 41. Another photoelectric cell 126 is carried by the plates 24 and 25 and is adapted, as will be said hereinafter, to determine the end of the projection, at the end of a film, as well as the rewinding of said film. As shown in particular in FIGURES 5 and 6, each spool 8 is fitted to a fixed pin on the corresponding spoke 7 where it is retained axially by a spring 190 applied to said spoke 7 and penetrating into a groove of the hub of said spool. Such construction is the same for each spool 11. The spring 190 serves also as a braking member for said spools 8 and 11, mainly if on termination of the projection or of rewinding one wants the spool to stop to keep said film in tension.

In said FIGURE 5 is also visible the wheel 56 in contact with the border 197 of the spool 8 by means of a gasket 196. A spring 195 presses upon a pulley 194 in whose throat is housed the belt 142; and said pulley in turn presses upon the wheel 56 through a friction member 193. A device analogous to the one just now described serves to transmit the rewinding movement to each spool 11.

As shown in FIGURE 10, a shaft 170 to be driven by means of an electric motor 160 carries a plurality of cams which are adapted to open and close a plurality of conventional switches, such as micro-switches at different times to control the various members of the machine. The motor 160 is fixed to the frame 1 of said machine.

In said figure is visible a cam 150 adapted to act upon the contacts 150' of a conventional switch which is wired in the circuit to motor 160, to interrupt the operation of said motor 160 at a time in the cycle determined by this cam. A cam 151 is adapted to act upon the contacts 161 of a conventional switch which is wired in circuit to the electromagnetic coil 120. The cam 152 operates the contacts 162 of a switch which is connected in a conventional circuit to operate the sound head 128. The cams 153 and 154 operate respectively the contacts 163 and 164 of switches which are connected in a conventional circuit to motor 26 so that when the first switch is closed and the second is open, the motor operates in one direction, and when the second switch is closed and the first is open the motor operates in the opposite direction thereby to drive the ropes 29 and 30 in opposite directions to move plates 24 and 25 toward or from one another.

On the shaft 170 there is also fitted the cam 155 adapted to act upon the contacts 165 of a conventional switch wired in the circuit of a conventional projection lamp 180 (FIG. 3). The cam 156 operates the contacts 166 of a conventional switch which is wired in the circuit of the motor, the shaft 84 whereof controls the movement of the film. The cam 157 operates contacts 167 of a conventional switch which is connected in a conventional circuit to the photoelectric cell 126. The cam 198 operates a conventional switch which is wired in a conventional contact 198' of the circuit to the photoelectric cell 40.

Starting from the rest position in which the plates 24 and 25 are away from each other, it is possible to bring the film to its accurate working position between said plates 24 and 25 by rotating the wheels 6 and 9 by means of the crank 140.

By depressing a push-button, an electric motor 160 is actuated and, therefore, the shaft 170 carrying the cams starts rotation. From this time on the various cams start action after one another, namely, the cam 151 closes the contacts 161 thereby energizing the electromagnetic coil 120 (FIG. 7) which by attracting the core 119, determines the unlocking of the three rolls 101 of the respective wheels 105, that is, renders said rolls loose. Subsequently the cam 152 determines the closing of the contacts 162 and conveys current to the sound head, whereafter the cam 153 controls the motor 26 so that the latter causes a loosening of the ropes 29 and 30 and, therefore, the plates 24 and 25 start their mutual approachment by action of the corresponding springs 22 and 23.

During said approachment, by means of the pawl 95, the ratchet wheel 141, the chain 129, the pinion 92, the toothed wheels 91 and 87 and the cam 88, there takes place the lowering of the claw 99 in such a manner that the sliding of the film returned will not be hindered by the small teeth of the claw while the film 127 is assuming its undulated shape. Moreover, the small wheels 74 and 125 as shown in FIGURE 4 press the film on the first roll 101 (the one nearer to the spool 8) and on the sound head 128; and each small wheel 71 is first lowered upon the film, since the lower end of the lever 61 by pressing on the rod 70 compels it to lower contemporaneously with the lowering of said plate 24. Subsequently, however, on termination of the lowering, when the upper end of the lever 61 comes to contact the lower end of the member 60, there takes place a rotation of said lever 61 in such a way that its lower end in leaving the aperture 64 liberates the rod 70 and, therefore, the latter, being attracted by the spring 63, rises again up to its initial position.

Said lowering of the small wheels 71 of both devices serves to create two loops in the film, close to the two ends of the member 138 on which said film rests in alignment with the claw 99. The loops cooperate with the intermittent feed of said film.

Also, by means of the mutual approachment of the plates 24 and 25, the small wheels 78 and 81 press the film upon two rolls 101 in such a manner as to determine good adhesion of said film on said rolls.

Subsequently to the mutual approachment of said plates 24 and 25, the cam 151 permits the re-opening of the contacts 161 and, therefore, when the coil 120 becomes deenergised, the three rolls 101 are again connected to the three wheels 105, since in every device comprising said wheels, the small rod 114 no longer presses on the dowel 113 owing to the action of a spring acting upon the cam 116 and, therefore, the disc 107 pushed by the spring 109 is engaged with said wheel 105.

Subsequently, the cam 156 on closing the contacts 166 actuates the motor whose shaft 84 drives the chain 129 for the feed of the film as well as the claw 99 for the intermittent movement thereof. Also the cam 155 by closing the contacts 165 determines the ignition of the lamp 180; and the cam 157 by closing the contacts 167 determines the lighting of the photoelectric cell 126.

Finally, by means of the cam 150, the motor 160 is stopped when the shaft 170 carrying the cams has performed a rotation of 180° from the starting of its movement.

When the movements above described have been accomplished, the projection of the film starts, which because of the transmission rolls 191 and 191', remains parallel to the axis of the shaft 5. During projection, the film that unwinds from a spool 11, comes to be rewound on the corresponding spool 8 since the latter is controlled to rotate by means of the belt 142 which transmits the movement to the pulley 194 which in turn transmits it to the wheel 56 through the friction member 193, said pulley 194 being pushed by a spring 195. The wheel 56 causes rotation of the spool 8, being in contact, by means of the gasket 196, with the flange 197 of said disc 8. The belt 142 is actuated by the pulley 101' illustrated in FIG. 8, which is rigid with that of the three rolls 101 nearer to the spool 8.

On termination of the projection, there comes to pass in correspondence with the photoelectric cell 126 a final section of transparent film, whence said cell restarts again the operation of the motor 160 which it controls.

At that time, the rotation of the shaft 170 is started and, therefore, the cams carried by said shaft intervene again. Namely, first the cam 156 intervenes, which re-opens the contacts 166 thereby determining the stopping of the drive shaft 84, whereafter the cam 157, by re-opening the contacts 167, cuts off current to the photoelectric cell 126. Then the cam 155 opens the contacts 165 thereby putting out the light of lamp 130 and the cam 152 opens the contacts 162 thereby cutting off current to the sound head.

Successively the cam 151 closes the contacts 161 thereby energising the coil 120 and rendering again loose the rolls 101, whereafter, through the cam 154, the motor 26 is driven in the direction in which the ropes 29 and 30 cause the plates 24 and 25 to be moved away from each other.

While the separation of the plates from each other takes place, the cam 193 closes the circuit of the photoelectric cell 40, and said cell in turn determines the closing of the circuit of the motor 38 and of the electromagnetic coil 36. So it happens that the electromagnetic coil 36 attracts the mobile core 45, thereby determining the rotation of the lever 34 in such a manner that the small wheel 37 comes to contact the border of the spool 11 from which the film has unwound. At the same time, said motor 38 starts action to begin rewinding the film on said spool 11. The rotation of said lever 34 also determines the entering of the lower end of said lever into a notch 34' of the wheel 9, corresponding to the same spool 11 which at that time starts rotating for rewinding.

On having thus started the rewinding of the film, the cam 154 determines the stopping of the motor 26, at the time at which the plates 24 and 25 have been taken sufficiently away from each other. The cam 151 determines the opening of the contacts 161 thereby cutting off current to the electromagnetic coil 120 and hence rendering again the rolls 101 and the wheel 105 rigid with one another. Finally, immediately after said intervention of the cams, the cam 150 stops the motor 160.

In the meantime, the rewinding of the film continues. Finally when said film has reached the end of said rewinding on the spool 11, its last section, which is black, registers with the photoelectric cell 40. Hence the action of said cell is discontinued and, therefore, the circuit of the motor 38 and of the electromagnetic coil 36 is re-opened.

So said motor stops while said electromagnetic coil 36 no longer attracts the movable core 45. Hence through the spring 42 the lever 34 accomplishes a rotation thereby detaching the small wheel 37 from the flange of the spool 11, and contemporaneously its lower end leaves the notch 34' of the wheel 9 in which it had previously engaged.

If, however, one wishes to bring to projection position a new film to be projected while the rewinding of the one previously projected is still taking place, it suffices to rotate by means of the crank 140 the two wheels 6 and 9 until said new film has reached the desired position, between the plates 24 and 25.

During that rotation the rewinding of the film goes on since on rotation of said wheel 9 for the positioning of the new film, it happens that the same wheel 9 in its movement drives the said lever 34 engaged with its lower end in said notch 34' of said wheel and, therefore, causes also the rotation therewith of the said support 33 carrying the rewinding device.

That is to say, there rotate contemporaneously around the axis of the shaft 5, the wheel 9 with the spools 11 and said rewinding device supported by the support 33 while the rewinding of the film is going on.

During said rotation, the motor 48 is not operating; and because the worm screw 46 is in engagement with the helical wheel 47 which is loose on the support 3, the wheel 47 rotates, too, with the support 33.

At the end of the rotation, when the new film has reached the desired position, between the plates 24 and 25, one of the holes 51 of the helical wheel 47, corresponding to said new film, has come to assume a position in correspondence with an end of the movable core 50 of the electromagnetic coil 49.

At the end of rewinding, owing to the above cited black part of the film, the photoelectric cell 40, as noted, determines the opening of the circuit of the motor 38 and of the electromagnetic coil 36. The same opening device determines contemporaneously the closing of the circuit comprising the motor 48 and the coil 49. Said circuit also comprises another contact which had been previously closed when the wheels 6 and 9 started rotation for the positioning of the new film. So the motor 48 starts rotating the worm screw 46 and at the same time, the movable core 50 actuated by the coil 49, penetrates with its end into the hole 51 of the helical wheel 47 thereby locking the latter to the frame 1 of the machine.

Since the helical wheel 47 is locked to the frame, the now-rotating worm 46, driven by motor 48, will revolve about the axis of wheel 47 carrying with it support 33 to index this support to a position where lever 34 and roller 37 will register with the film spool 11 which with the new film 127 has just been indexed into position for projecting the film.

When the rewinding mechanism carried by support 33 is in registry with the new film, that contact in the circuit to motor 48 and coil 49, which was closed when the two wheels 6 and 9 started rotation to index the new film into projecting position, is opened, stopping motor 48 and deenergizing coil 49. The cycle is now complete.

I claim:

1. In a machine for projecting motion picture film, a pair of movably mounted plates, film driving means, a source of illumination and a projection system all mounted on said plates, means for moving said plates toward and away from one another to move them toward and away from operative projecting position, a pair of axially spaced reel-holding members mounted at opposite ends, respectively, of said plates and rotatable together on a common axis, means for mounting a plurality of film holding reels in angularly spaced relation on said spaced members for rotation on parallel axes extending in a direction at right angles to said common axis, each reel on one of said members being paired with one reel on the other of said members to support a length of film therebetween, means for rotating said members together when said plates are in inoperative position to position a pair of reels so that a selected length of film will be in projecting position, means for operating said film driving means and said projection system when said plates are in operative position to rotate said selected pair of reels to move film through the projector from one reel of said selected pair of reels onto the other reel of said selected pair, means for rewinding the film onto said one reel after the projection of said film upon the movement of the plates away from one another, a supporting member for said rewinding means mounted to rotate on said common axis, means locking said rewinding means in operative position with said one reel to continue the rewinding of the film while said reel-holding members are being rotated to move the pair of reels which carry the film that is being rewound out of projecting position and to move another pair of reels into projecting position, a gear mounted to rotate about said common axis, a worm rotatably mounted on said supporting member and meshing with said gear, and means for disengaging said locking means and for locking said first-mentioned gear against rotation relative to said reel-holding members upon completion of the rewinding of the film on said one reel and for driving said worm to cause said supporting member to rotate relative to said gear to bring said rewinding means into operable position with one reel of the pair of reels which have been newly indexed into projecting position.

2. In a machine for projecting motion picture film, a pair of movably mounted plates, film driving means, a source of illumination and a projection system all mounted on said plates, means for moving said plates toward and away from one another to move them toward and away from operative projecting position, a pair of axially spaced reel-holding members mounted at opposite ends, respectively, of said plates and rotatable together on a common axis, means for mounting a plurality of film holding reels in angularly spaced relation on said spaced members for rotation on parallel axes extending in a direction at right angles to said common axis, each reel on one of said members being paired with one reel on the other of said members to support a length of film therebetween, means for rotating said members together when said plates are in inoperative position to position a pair of reels so that a selected length of film will be in projecting position, means for operating said film driving means when said plates are in operating position to rotate said selected pair of reels to move film through the projection system from one reel of said selected pair of reels onto the other reel of said selected pair, a film rewind device, comprising a supporting member rotatable about said common axis, a lever pivotally mounted on said supporting member, a roller mounted adjacent one end of said lever to frictionally engage one reel of said selected pair when said lever is in one pivotal position, means carried by said supporting member for driving said roller, means adjacent the other end of the lever to lock said supporting member to the reel holding member that supports said one reel when the lever is in said one pivotal position so that said supporting member will rotate with said one reel-holding member, means pivoting the lever to said one position upon the completion of the projection of the film and upon movement of said plates out of operative position to hold the roller in operative engagement with said one reel when another length of film is in projecting position and being driven through the projector, spring means constantly urging said lever away from said one position, a helical gear rotatably mounted on said common axis, a worm rotatably mounted on said supporting member in engagement with said helical gear, means operative upon the completion of the rewinding of film onto said one reel to rigidly lock said helical gear against rotation and to cause said spring means to pivot said lever to its other position, means driving said worm to rotate said supporting member about said common axis relative to said helical gear and said reel holding members upon the completion of the rewinding of film onto said one reel, and means stopping the worm driving means and rendering said helical gear locking means inoperative when said rewind device is in registry with the reel of film which has newly been indexed into projecting position.

3. A machine for projecting motion picture film comprising a frame, a rotary member journaled in said frame, two wheels fixedly secured to said member in axially spaced relation, means for supporting a plurality of reels on each member in angularly spaced relation with the reels of one member paired with the reels of the other member to support a length of film between them, a pair of plates mounted on said frame to extend between said wheels, a two-part film gate, one part of which is secured to each of said plates, means carried by one of said plates for driving film positioned in said gate, means for moving one of said plates, at least, toward and from the other plate, means for rotatably indexing said rotary member when said plates are moved apart to move a selected pair of reels into position to dispose the film supported thereby between the two parts of said film gate, said plates when moved together positioning the two parts of the film gate at opposite sides of the film and engaging said film driving means with the film, a support mounted coaxially with said rotary member for rotation relative thereto, means carried by said support for selectively driving the reels mounted on one of said wheels to rewind film thereon, means for rotating said support relative to said rotary member to bring said rewinding means into operative relation with that reel of said one wheel which is in projecting position to rewind the film thereon, and means for locking said support to said wheels to rotate with said wheels during indexing of said rotary member until the rewinding is completed, and means for actuating said support-rotating-means upon completion of the rewinding operation to index said rewinding means into operative relation with one of the pair of reels that has newly been indexed into projecting position, and means controlling the cycle of operation of said machine so that upon completion of projection of a length of film said rewinding means is started, said plates are moved apart, said rotary member is indexed to move the pair of reels, which carry the previously-projected film, out of projecting position and to bring another pair of reels into projecting position, said plates are moved into operative relation again to close the film gate on the length of film between the new pair of reels and to bring the film driving means into engagement with this new length of film, and, after the winding of the previously projected film, said support is unlocked from said wheels and is rotated to bring the rewinding means into operative relation with one of the reels which carry the new film.

4. A machine for projecting motion picture film as claimed in claim 3 wherein said rewinding means includes a motor mounted on said support, a lever pivoted on said support, a driving roller carried at one end of said lever and adapted to engage and drive a reel, a locking dog carried at the other end of said lever, and wherein one of said wheels has a plurality of notches spaced angularly about its axis and corresponding in number and relative position to the number of reels mounted on said one wheel, and wherein means is provided on said support for moving said lever to position said roller in operative relation to a reel and to simultaneously engage said locking dog in one of said notches to lock said support to said wheels, and wherein means is provided connecting said lever to said support and constantly urging said lever to inoperative position.

References Cited in the file of this patent

UNITED STATES PATENTS

| 1,944,024 | Foster et al. | Jan. 16, 1934 |
| 2,200,681 | Rollings | May 14, 1940 |
| 2,227,259 | Hokanson | Dec. 31, 1940 |
| 2,233,409 | Foster et al. | Mar. 4, 1941 |
| 2,280,750 | Emerson | Apr. 21, 1942 |
| 2,290,071 | Rinaldy | July 14, 1942 |
| 2,434,201 | Engelken | Jan. 6, 1948 |

FOREIGN PATENTS

| 201,202 | Great Britain | July 30, 1923 |